(12) United States Patent
Kim et al.

(10) Patent No.: US 7,126,925 B2
(45) Date of Patent: Oct. 24, 2006

(54) APPARATUS AND METHOD FOR MULTI-PATH SEARCH USING DUAL CODE GENERATORS

(75) Inventors: Dae-Ho Kim, Daejeon (KR);
Chang-Wahn Yu, Daejeon (KR);
Kyung-Hi Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1037 days.

(21) Appl. No.: 10/184,107

(22) Filed: Jun. 28, 2002

(65) Prior Publication Data
US 2003/0123402 A1  Jul. 3, 2003

(30) Foreign Application Priority Data
Dec. 27, 2001 (KR) ................................ 2001-86263

(51) Int. Cl.
*H04B 7/216* (2006.01)
(52) U.S. Cl. .................. 370/320; 370/335; 370/342
(58) Field of Classification Search ................ 370/320, 370/335, 342, 331, 336, 441, 535, 513, 525; 375/130, 150
See application file for complete search history.

(56) References Cited
U.S. PATENT DOCUMENTS 6,188,682 B1 * 2/2001 Takagi et al. ............... 370/342
6,738,411 B1 * 5/2004 Ogawa et al. .............. 375/130

* cited by examiner

*Primary Examiner*—Chi Pham
*Assistant Examiner*—Alexander O. Boakye
(74) *Attorney, Agent, or Firm*—Mayer, Brown, Rowe & Maw LLP

(57) ABSTRACT

An apparatus for multi-path search using a dual code generator includes: first and second code generators for generating first and second search codes, changing phases, and generating a search-done interrupt; a multi-path search engine for receiving the search codes from the code generators and performing a search process for detection of the multiple paths; a search controller for controlling the code generators to generate the search codes, and sending the search-done interrupt from the code generators; and a drive controller for generating a slewing command to the search paths and a search command, sending the commands to the search controller, reading search results from the search controller upon generation of the search-done interrupt, and generating second slewing and search commands for a new search process.

8 Claims, 4 Drawing Sheets

APPARATUS AND METHOD FOR MULTI-PATH SEARCH USING DUAL CODE GENERATORS

BACKGROUND OF THE INVENTION (a) Field of the Invention

The present invention relates to an International Mobile Telecommunication 2000 (IMT-2000). More specifically, the present invention relates to an apparatus and method for a multi-path search using a dual code generator that reduces a slewing time for path acquisition by using a dual code generator in a multi-path searcher.

(b) Description of the Related Art

In general, the multi-path searcher is an apparatus designed to detect multiple paths occurring due to reflection waves caused by movement of vehicles or surrounding buildings in the mobile communication environment, and to demodulate the detected multiple paths via a demodulator, thereby increasing the gain of the receiver. The time required for path acquisition is an important valuation basis of the multi-path searcher's performance. The time required for path acquisition is divided into the make-ready time and the actually required time for path acquisition. The conventional searchers employ double dwell serial searching or determination of the optimized integral time to cut down the actually required time for path acquisition, but they do not use a method for reducing the make-ready time.

FIG. 1 is a block diagram of an apparatus for a multi-path search according to prior art, and FIG. 2 is an illustration showing a method for a multi-path search according to prior art.

The conventional apparatus for a multi-path search comprises: a multi-path searcher controller 20 for controlling the total operation of the multi-path searcher under the control of a driving software controller 10; a code generator 30 for generating codes necessary for search under the control of the multi-path searcher controller 20; and a multi-path searcher engine 40 for receiving the search codes from the code generator 30 and actually performing the multi-path search process.

The multi-path acquisition process of the multi-path searcher under the control of the driving software controller 10 involves generation of the codes necessary for multi-path acquisition, slewing to the target position, and performing the actual multi-path search process. Upon receiving slewing and search commands Slew1 and Search Command from the driving software controller 10, as shown in FIG. 2, the multi-path searcher moves as far as Slew1 and performs a search process. After the completion of the search process, the multi-path searcher generates a search-done interrupt Srch_done1, and the driving software reads out the search result and sends slewing and search commands Slew1 and Search Command again. The conventional multi-path searcher repeats the above procedures. But, the conventional multi-path searcher takes a considerable time in moving to a specific position for a multi-path search, as illustrated in FIG. 2.

SUMMARY OF THE INVENTION

It is an object of the present invention to use a dual code generator so as to eliminate the make-ready time for multi-path acquisition that is inevitable when using a single code generator in the conventional multi-path searcher, and to reduce a slewing time for multi-path acquisition, thereby cutting down the total time required for a multi-path search.

To achieve the above object, the present invention controls a second code generator to move to a specific position for the next search process in advance while using a first code generator for a first search process, and to perform a second search process immediately after the completion of the first search process, thereby eliminating a slewing time and reducing the total time required for path acquisition.

In one aspect of the present invention, there is provided an apparatus for a multi-path search using a dual code generator, said apparatus detecting multiple paths occurring in a mobile communication environment and demodulating them to increase the gain of a receiver, the apparatus including: first and second code generators for generating first and second search codes necessary for a multi-path search, changing a phase, and generating a search-done interrupt; a multi-path search engine for receiving the search codes from the first and second code generators and performing a search process for detection of the multiple paths occurring in the mobile communication environment; a search controller for controlling the first and second code generators to generate the search codes, and sending the search-done interrupt from the first and second code generators; and a drive controller for generating a slewing command to the search paths and a search command, sending the commands to the search controller, reading out a search result from the search controller upon generation of the search-done interrupt, and generating a second stewing command and a second search command for a new search process.

In another aspect of the present invention, there is provided a method for a multi-path search using a dual code generator, said method detecting multiple paths occurring in a mobile communication environment and demodulating them to increase the gain of a receiver, wherein the dual code generator comprises first and second code generators for generating first and second search codes necessary for a multi-path search, changing a phase, and generating a search-done interrupt, the method including: (a) sending a first stewing command to the first code generator, moving as far as an amount according to the first slewing command, and standing by to receive a first interrupt for the completion of the stewing; (b) upon receiving the first interrupt, sending a second stewing command to the second code generator and controlling the first code generator to perform a search process according to a first search command; (c) upon receiving the search-done interrupt according to the first search command, sending a third slewing command to the first code generator and controlling the second code generator to perform a search process according to a second search command; and (d) reading a search result alternately using the first and second code generators and sending a new search command, said process being repeated as many times as the multi-path search is done.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
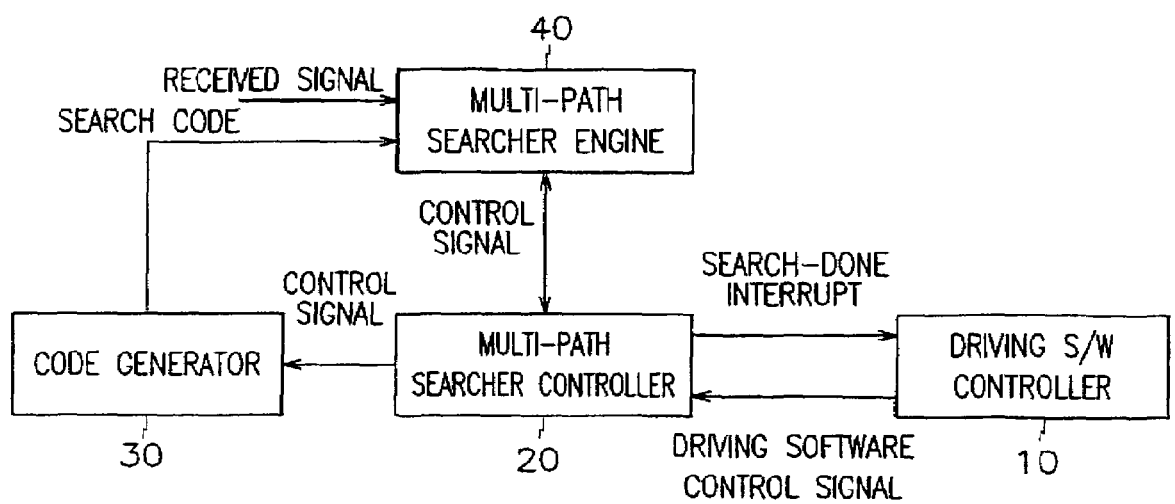
FIG. 1 is a block diagram of an apparatus for a multi-path search according to prior art.
Figure 2:
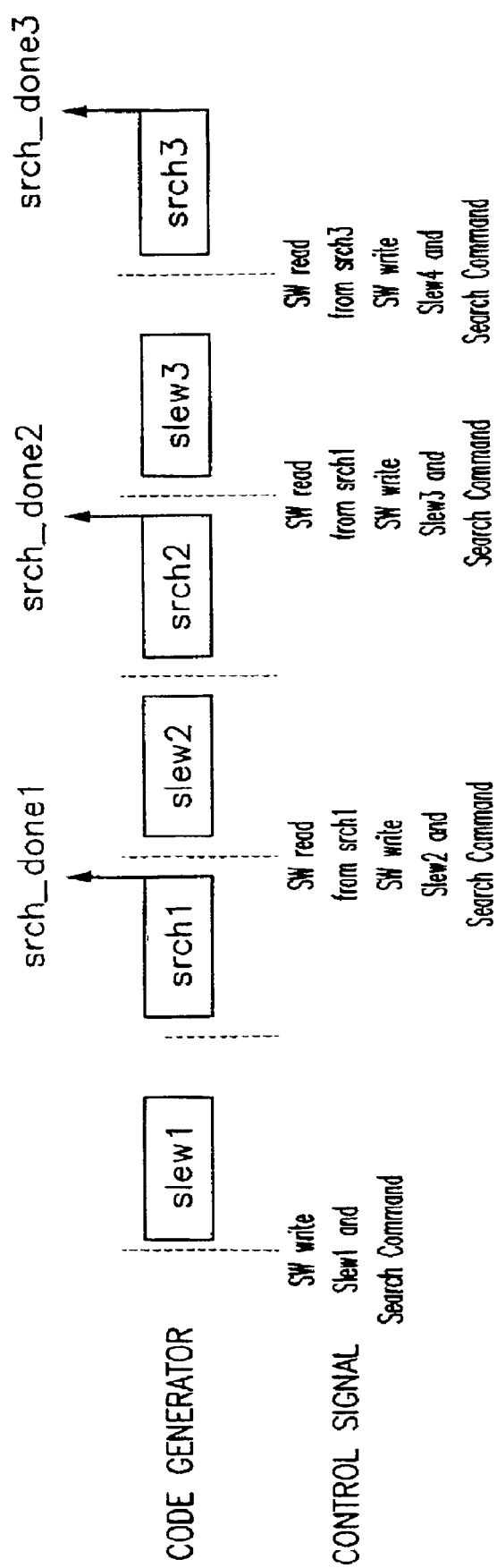
FIG. 2 is an illustration showing a method for a multi-path search according to prior art.
Figure 3:
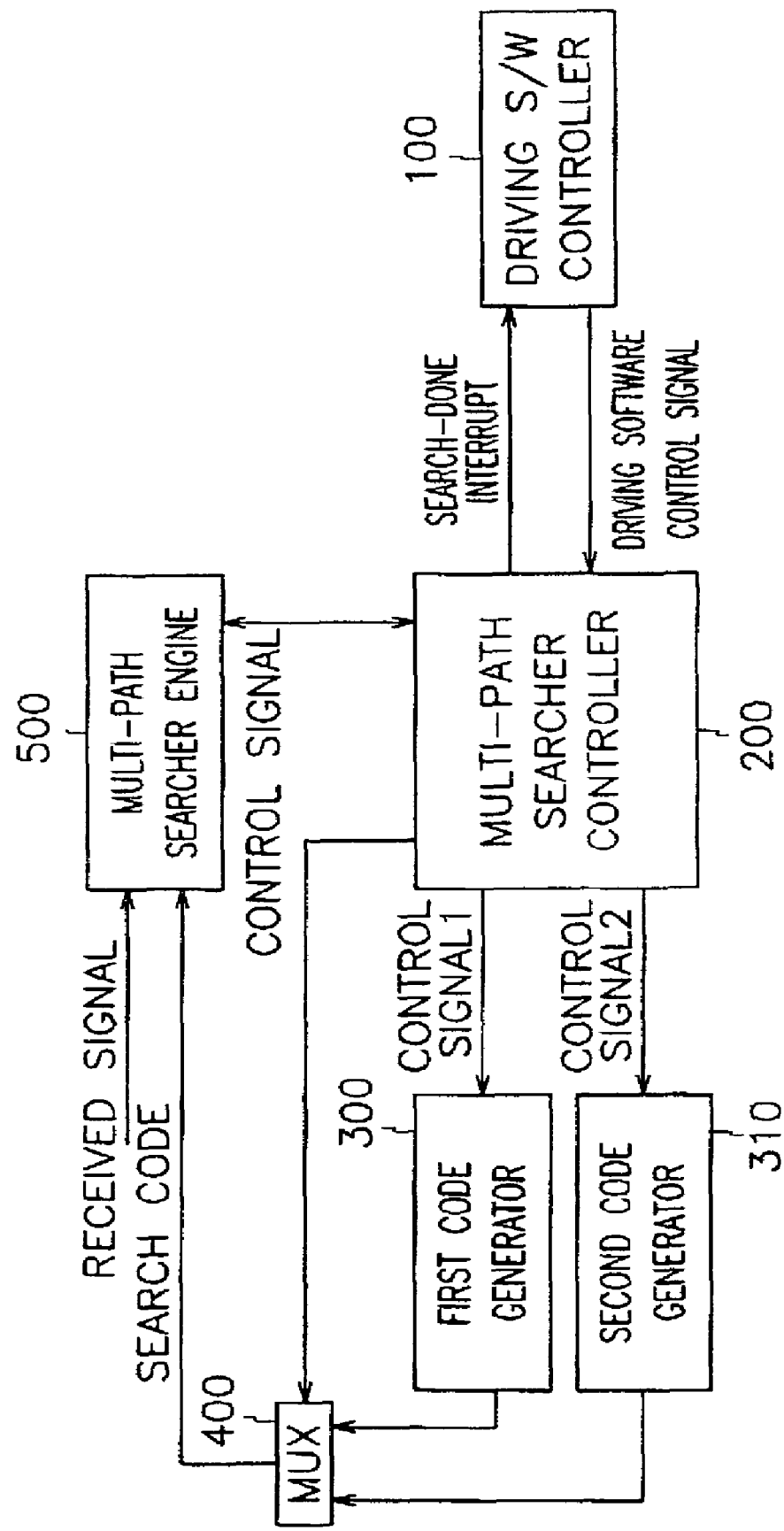
FIG. 3 is a block diagram of an apparatus for a multi-path search using a dual code generator according to an embodiment of the present invention.

FIG. 3 is a block diagram of an apparatus for a multi-path search using a dual code generator according to an embodiment of the present invention.

As illustrated in FIG. 3, the apparatus for a multi-path search using a dual code generator according to an embodiment of the present invention comprises: a multi-path searcher controller 200 for receiving a control signal from a driving software controller 100 and controlling the operation of at least one multi-path searcher; first and second code generators 300 and 310 for receiving a control command from the multi-path searcher controller 200, generating codes necessary for a multi-path search, and changing the phase; a multiplexer (hereinafter, referred to as "MUX") 400 for receiving the multi-path search codes from the first and second code generators 300 and 310 and multiplexing them; and a multi-path searcher engine 500 for receiving the multi-path search codes from the MUX 400 and detecting multiple paths occurring in the mobile telecommunication environment.

Now, a description will be given to the operation of the apparatus for a multi-path search using a dual code generator, and a method for a multi-path search according to an embodiment of the present invention, with reference to the accompanying drawings.

Figure 4:
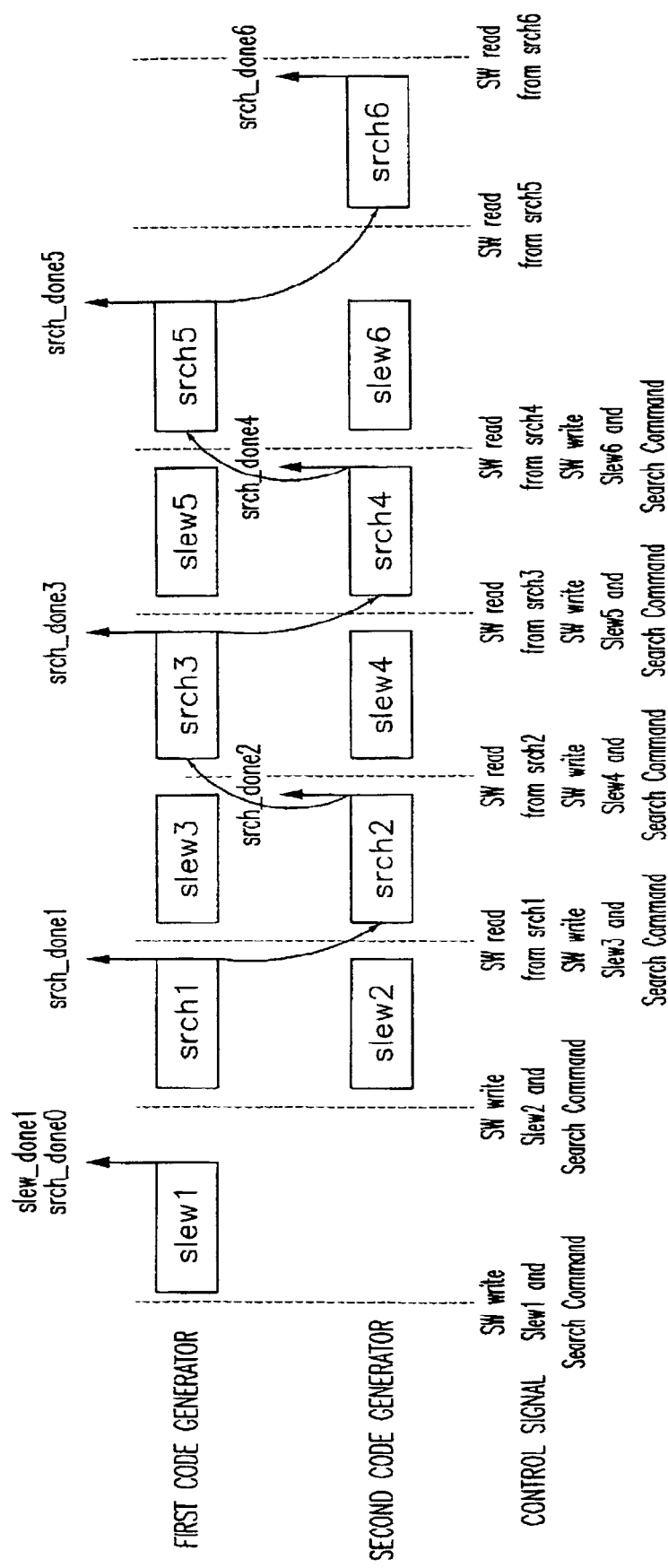
FIG. 4 is an illustration showing a method for a multi-path search using a dual code generator according to an embodiment of the present invention.

FIG. 4 is an illustration showing a method for a multi-path search using a dual code generator according to an embodiment of the present invention.

The multi-path search controller 200 receives first slewing and search commands Slew1 and Search Command for a multi-path search using the first code generator 300 from the driving software controller 100, and generates a first control signal to the first code generator 300.

After receiving the first control signal from the multi-path searcher controller 200, the first code generator 300 generates a multi-path search code and sends it to the MUX 400. The MUX 400 multiplexes the multi-path search code received from the first code generator 300, and sends it to the multi-path searcher engine 500.

The multi-path searcher engine 500 moves as far as Slew1, generates a search-done interrupt Srch_done0, and performs a search process using the first code generator 300. The interrupt at this time is an imaginary interrupt generated only when the search process is not actually done, but it is being performed first to act in concert with the driving software controller 100 in regard to a control flow.

Upon receiving the imaginary interrupt from the multi-path searcher controller 200, the driving software controller 100, considering the interrupt generated under the first slewing and search commands as an imaginary interrupt, does not read out the search result, but sends second stewing and search commands SW write, Slew2, and Search Command, for a multi-path search using the second code generator 310.

The multi-path searcher controller 200, after receiving the second stewing and search commands from the driving software controller 100, sends a second control command to the second code generator 310. The second code generator 310 generates search codes according to the second control command, and sends them to the multi-path searcher engine 500 via the MUX 400. The multi-path searcher engine 500 moves as far as Slew2 using the second code generator 310, and stands by without performing another search process until the search process using the first code generator 300 ends. After the completion of the search process using the first code generator 300 and the generation of a search-done interrupt Srch_done1, the multi-path searcher controller 200 sends a second control signal to the second code generator 310 to start the search process using the second code generator 310.

Upon the search-done interrupt Srch_done1 being generated from the second code generator 310, the driving software controller 100 reads out the result of the search process using the first code generator 300 from the multi-path searcher controller 200, and sends third slewing and search commands Slew3 and Search Command for a new search process using the first code generator 300.

Subsequently, the driving software controller 100 repeats the procedures of reading the search result alternately using the first and second code generators 300 and 310, and sending a new search command.

Finally, when the last two search-done interrupts srch_done5 and srch_done6 occur after six searches, as shown in FIG. 4, the driving software controller 100 reads out the search result from the multi-path searcher controller 200 without sending a new search command, and ends the search process.

Compared with the conventional multi-path searcher, the apparatus for a multi-path search according to the embodiment of the present invention achieves almost double the search speed. Because the embodiment of the present invention uses another code generator, there is almost no increase in the hardware complexity and gate counter in the actual implementation.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, the apparatus and method for multi-path search using a dual code generator according to the present invention uses a dual code generator to eliminate a make-ready time required for multi-path acquisition and thereby reduce the total time for path acquisition. Because the required search time is constant, with the search interval and the integral time fixed, the present invention controls a second code generator to move to a specific position for the next search process in advance while using a first code generator for a first search process, and to perform a second search process immediately after the completion of the first search process, thereby eliminating a slewing time and reducing the total time required for path acquisition. In particular, the slewing time for searching an adjacent base station to achieve a handover is considerable. Therefore, the use of the present invention greatly reduces the search time required for stewing in searching the adjacent base station for handover.

What is claimed is:

1. An apparatus for a multi-path search using a dual code generator, said apparatus detecting multiple paths occurring in a mobile communication environment and demodulating them to increase the gain of a receiver, the apparatus comprising:
    first and second code generators for generating first and second search codes necessary for a multi-path search, changing a phase, and generating a search-done interrupt;
    a multi-path search engine for receiving the search codes from the first and second code generators and performing a search process for detection of the multiple paths occurring in the mobile communication environment;
    a search controller for controlling the first and second code generators to generate the search codes, and sending the search-done interrupt from the first and second code generators; and
    a drive controller for generating a slewing command to the search paths and a search command, sending the commands to the search controller, reading out a search result from the search controller upon generation of the search-done interrupt, and generating a second slewing command and a second search command for a new search process.

2. The apparatus as claimed in claim 1, wherein the first and second code generators comprise:
    a first code searcher for receiving a first control signal from the search controller and generating the first search code;
    a second code searcher for receiving a second control signal from the search controller and generating the second search code; and
    a multiplexer for receiving the first and second search codes from the first and second code searchers, respectively, and multiplexing the received first and second search codes to be sent to the multi-path search engine.

3. The apparatus as claimed in claim 1, wherein the drive controller sends a first slewing command to the first code generator, moves as far as an amount according to the first stewing command, and stands by to receive a first interrupt for the completion of the slewing;
    upon receiving the first interrupt, the drive controller sends a second slewing command to the second code generator and controls the first code generator to perform a search process according to a first search command;
    upon receiving the search-done interrupt according to the first search command, the drive controller sends a third slewing command to the first code generator and controls the second code generator to perform a search process according to the second search command; and
    the drive controller reads the search result alternately using the first and second code generators and sends a new search command, said process being repeated as many times as the multi-path search is done.

4. The apparatus as claimed in claim 3, wherein the first interrupt is an imaginary interrupt generated for the first time only when the first search process is performed so as to act in concert with the drive controller in regard to a control flow.

5. The apparatus as claimed in claim 1, wherein the drive controller reads the search result from the multi-path search controller without sending a new search command and ends the search process upon generation of the last two search-done interrupts, when repeatedly sending the slewing and search commands as many times as the search process is done.

6. A method for a multi-path search using a dual code generator, said method detecting multiple paths occurring in a mobile communication environment and demodulating them to increase the gain of a receiver,
    wherein the dual code generator comprises first and second code generators for generating first and second search codes necessary for a multi-path search, changing a phase, and generating a search-done interrupt, the method comprising:
    (a) sending a first slewing command to the first code generator, moving as far as an amount according to the first stewing command, and standing by to receive a first interrupt for the completion of the slewing;
    (b) upon receiving the first interrupt, sending a second slewing command to the second code generator and controlling the first code generator to perform a search process according to a first search command;
    (c) upon receiving the search-done interrupt according to the first search command, sending a third slewing command to the first code generator and controlling the second code generator to perform a search process according to a second search command; and
    (d) reading a search result alternately using the first and second code generators and sending a new search command, said process being repeated as many times as the multi-path search is done.

7. The method as claimed in claim 6, further comprising reading a search result from a multi-path search controller without sending a new search command and ending the search process upon generation of the last two search-done interrupts, when repeatedly sending the slewing and search commands as many times as the search process is done.

8. The method as claimed in claim 6, wherein the first interrupt is an imaginary interrupt generated for the first time only when the first search process is performed so as to act in concert with a drive controller in regard to a control flow.

* * * * *